United States Patent [19]
Parker

[11] 3,785,850

[45] Jan. 15, 1974

[54] METHOD OF APPLYING ACRYLIC FUNCTIONAL CARBONATE ESTER COATING TO PLASTIC SUBSTRATES USING HIGH ENERGY IONISING RADIATION

[75] Inventor: Gordon M. Parker, Apollo, Pa.

[73] Assignee: PPG Industries, Inc., Pittsburgh, Pa.

[22] Filed: Oct. 18, 1971

[21] Appl. No.: 190,327

Related U.S. Application Data

[63] Continuation-in-part of Ser. No. 829,754, June 2, 1969, abandoned.

[52] U.S. Cl. 117/93.31, 117/138.8 R, 117/138.8 E, 117/138.8 A, 117/138.8 F, 117/138.8 UA, 117/161 UC, 117/161 UB, 204/159.22, 260/77.5 UA, 260/901
[51] Int. Cl. B44d 1/50, C08f 11/00
[58] Field of Search 117/93.31, 161 UC, 117/161 UB, 161 R, 138.8 R, 138.8 E, 138.8 A, 138.8 F, 138.8 UA; 260/77.5 UA, 901; 204/159.22

[56] References Cited
UNITED STATES PATENTS 2,370,572  2/1945  Muskat et al. ............... 260/77.5 UA
3,188,228  6/1965  Magat et al. .................. 117/93.31
3,188,229  6/1965  Graham ......................... 117/93.31
3,361,842  1/1968  Applegath et al. ............ 117/93.31

FOREIGN PATENTS OR APPLICATIONS 606,716  8/1948  Great Britain ............. 260/77.5 UA

*Primary Examiner*—William D. Martin
*Assistant Examiner*—John H. Newsome
*Attorney*—Russell A. Eberly

[57] ABSTRACT

Phosgene is reacted with a polyhydroxy containing compound to form a polychloroformate. The polychloroformate is then reacted with an acrylate containing one hydroxyl group in the presence of an acid acceptor to form the novel complex acrylate esters of this invention. The product is highly radiation-sensitive so that it may be polymerized by ionizing irradiation and forms a coating on plastic substrates which is hard, stain-resistant and abrasion-resistant.

8 Claims, No Drawings

METHOD OF APPLYING ACRYLIC FUNCTIONAL CARBONATE ESTER COATING TO PLASTIC SUBSTRATES USING HIGH ENERGY IONISING RADIATION

CROSS REFERENCE TO RELATED APPLICATIONS

This application is a continuation-in-part of application Ser. No. 829,754 filed June 2, 1969, now abandoned.

BACKGROUND OF THE INVENTION

This invention, in general, deals with novel compounds which are highly radiation-sensitive and which form unexpectedly good coatings on plastic substrates. The novel compounds are complex arcylate esters containing at least two carbonate linkages which when subjected to low doses of ionizing irradiation polymerize to form extremely strong and stain-resistant materials.

The novel compounds used in this invention are complex arcylate esters which are derived from the reaction of a mono, di, or tri acrylate containing one hydroxyl group with a polychloroformate and preferably a bis-chloroformate which is the reaction product of phosgene and a polyhydroxy containing compound. The product is a monomer having a plurality of carbonate linkages.

The polyhydroxy compound that is reacted with phosgene is generally a polyhydric saturated or unsaturated alcohol such as ethylene glycol, propylene glycol, butylene glycol, isobutylene glycol, trimethylene glycol, pentamethylene glycol, or the corresponding polyglycols such as di, tri, or tetraethylene glycol, or the corresponding propylene or butylene or isobutylene polyglycols, glycerol, methyl glycerol, polyglycerols such as diglycerin or triglycerin, mannitol, sorbitol, polyvinyl alcohol, hydrated cellulose, cellulose monoacetate, cellulose mono butyrate, starch, sugars, aromatic alcohols such as phthalyl alcohols, may be reacted with phosgene in accordance with this invention. The preferred polyhydroxy compounds are glycols and polyglycols.

Generally speaking, the preferred hydroxy compounds have the formula $R''(OH)_x$ wherein $R''$ is a substituted or unsubstituted aryl, alkyl, or cycloalkyl group having from about 2 carbon atoms to about 20 carbon atoms and $x$ is a whole number from 2 to 4. The $R''$ group may be substituted with any group that does not have an active hydrogen atom such as amine, thiol, etc., groups. Examples of substituted groups which may be used are alkoxy, ketoxy, ester substituted groups and other substituted groups.

The reaction of phosgene with the polyhydroxy compound needs no solvent or catalyst but a solvent may be used, if desired. It is carried out at from about −10°C. to about 25°C. by bubbling phosgene gas through the polyhydroxy compound at a rate which will not raise the temperature of the mixture above 50°C. (This is an exothermic reaction.)

The reaction is generally equimolar but it is preferred to add a slight excess of phosgene. The proportion of components, however, is not critical. After the reaction is completed, the resulting polychloroformate is heated from about 50°C. to about 70°C. to drive off dissolved hydrochloric acid and the product is then washed, dried and filtered.

The product of the above reaction is a polychloroformate. The preferred polychloroformates are bischloroformates such as ethylene glycol bischloroformate, diethylene glycol bischloroformate, polyethylene glycol bischloroformate, and the like. However, other polychloroformates such as the trischloroformate of trimethylolpropane or the trischloroformate of glycerol may be used.

The mono, di, or tri acrylates that are reacted with the polychloroformates obtained in the above manner contain one hydroxyl group which contains the only active hydrogen atom in the compound. In other words, the compound may not contain other groups having reactive hydrogen atoms such as amines, thiols, etc. The most preferred of these acrylates is the mono acrylate (hydroxy alkyl acrylate or methacrylate). Generally, these acrylates and methacrylates have the formula

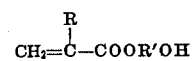

wherein R is selected from the group consisting of hydrogen and methyl and $R'$ is a substituted or unsubstituted alkyl group having from about two to about 16 carbon atoms. Examples of these compounds are hydroxy ethyl acrylate, hydroxy ethyl methacrylate, hydroxy butyl acrylate, hydroxy lauryl acrylate, hydroxy lauryl methacrylate, hydroxy isooctyl acrylate, hydroxy undectyl methacrylate, hydroxy 2,4,4-trimethylpentylacrylate, hydroxy 2,4,4-trimethylpentylmethacrylate, and the like. The alkyl groups may be substituted with halogens such as chlorine, alkoxy radicals, or $R'''COO-$ radicals wherein $R'''$ is a saturated or unsaturated hydrocarbon such as alkyl or alkylene.

Other acrylates having one hydroxyl group which may be used here are the di or tri acrylates such as 1,3-glycerol diacrylate, 1,3-glycerol dimethacrylate, pentaerythritol triacrylate, trimethylol propane diacrylate, and the like.

The reaction of the acrylate with the bischloroformate takes place in the presence of an acid acceptor. The acid acceptor is necessary to tie up the HCl that is split off from the reaction to prevent HCl addition to the double bond of the monomer. Any acid acceptor may be used but it is preferable to use an aqueous base or a tertiary amine. Examples of typical acid acceptors that may be used are pyridine, trimethyl amine, aqueous sodium carbonate, triethyl amine, aqueous sodium hydroxide, and the like.

A solvent is generally used for the acrylate so that the resulting salt is dispersed and the product is more easily filtered thus giving a better yield. Any solvent that is insoluble in water and unreactive with phosgene may be used. The preferred solvents are benzene, toluene, ethyl acetate, methylene chloride, trichloroethylene, and the like.

The reaction is carried out by adding the polychloroformate to a solvent solution of the acrylate and an acid acceptor such as pyradine. Generally it is preferred to react the polychloroformate and acrylate at low temperatures of from about −10°C. to about 50°C. As this reaction is also exothermic, the rate of addition of the bischloroformate should be low enough so that the temperature of the components do not exceed 50°C.

The proportions of the components may be varied over a wide range but generally 1 mol of polychloroformate is reacted for every 2 mols of acrylate. The relative amounts of the components are not critical. Also it is preferable to use at least 2 mols of acid acceptor for every mol of polychloroformate so that all the HCl generated will be tied up.

The product of the reaction is filtered out, washed, and dried and the solvent is stripped. The monomer obtained may be polymerized by peroxide addition with heat or it may be polymerized by ionizing irradiation or actinic light.

The monomers prepared in this manner are extremely radiation-sensitive and are polymerized by subjecting them to ionizing irradiation after coating on the plastic substrate.

The term "irradiation", as used herein, means high energy radiation and/or the secondary energies resulting from conversation of electrons or other particle energy to X-rays or gamma radiation. While various types of irradiation are suitable for this purpose, such as X-ray and gamma rays, the radiation produced by accelerated high energy electrons has been found to be very conveniently and economically applicable and to give very satisfactory results. However, regardless of the type of radiation and the type of equipment used for its generation or application, the use thereof in the practice of the invention as described herein is contemplated as falling within the scope of this invention so long as the ionization radiation is equivalent to at least about 100,000 electron volts.

While there is no upper limit to the electron energy that can be so applied advantageously, the effects desired in the practice of this invention can be accomplished without having to go to above about 20,000,000 electron volts. Generally, the higher the electron energy used, the greater is the depth of penetration into the massive structure of the materials to be treated. For other types of radiation, such as gamma and X-rays, energy systems equivalent to the above range of electron volts are desirable.

It is intended that the term "irradiation" include what has been referred to in the prior art as "ionixing radiation" which has been defined as radiation possessing an energy at least sufficient to produce ions or to break chemical bonds and thus includes also radiations such as "ionizing particle radiation" as well as radiations of the type termed "ionizing electromagnetic radiation".

The term "ionizing particle radiation" has been used to designate the emission of electrons or highly accelerated nuclear particles such as protons, neutrons, alpha-particles, deuterons, beta-particles, or their analogs, directed in such a way that the particle is projected into the mass to be irradiated. Charged particles can be accelerated by the aid of voltage gradients by such devices as accelerators with resonance chambers, Van der Graaff generators, betatrons, synchrotons, cyclotrons, etc. Neutron radiation can be produced by bombarding a selected light metal such as beryllium with positive particles of high energy. Particle radiation can also be obtained by the use of an atomic pile, radioactive isotopes or other natural or synthetic radioactive materials.

"Ionizing electromagnetic irradiation" is produced when a metallic target, such as tungsten, is bombarded with electrons of suitable energy. This energy is conferred to the electrons by potential accelerators of over 0.1 million electron volts (mev.). In addition to irradiation of this type, commonly called X-ray, an ionizing electromagnetic irradiation suitable for the practice of this invention can be obtained by means of a nuclear reactor (pile) or by the use of natural or synthetic radioactive material, for example, cobalt 60.

Various types of high power electron linear accelerators are commercially available, for example, the ARCO type travelling wave accelerator, model Mark I, operating at 3 to 10 million electron volts, such as supplied by High Voltage Engineering Corporation, Burlington, Mass., or other types of accelerators as described in U.S. Pat. No. 2,763,609 and in British Patent No. 762,953 are satisfactory for the practice of this invention.

The monomers described herein will polymerize acceptably using any total dosage between about 0.2 megarads and about 20 megarads. A "rad" is defined as that amount of irradiation required to supply 100 ergs per gram of material being treated and a "megarad" is $10^6$ rads. The total dosage is the total amount of irradiation received by the monomer.

The polymers formed have great utility as coatings for all types of substrates such as protective coatings for wood, metal, and other substrates and they have the advantage of having superior stain resistance, scratch resistance, and a high degree of crosslinking. However, it has been found that when the monomers are coated onto plastic substrates and subjected to high energy ionizing irradiation, a chemical graft between the coating and substrate is formed, insuring a strong bond between coating and substrate.

The unexpectedly superior bonding of this particular coating is found with any plastic substrate. By "plastic" it is meant that the material is a generally high molecular weight thermoplastic such as polyacrylates, such as polymethylmethacrylate, polybutylacrylate, and the like. Polycarbonates such as Lexan which is a product of phosgene and bisphenol A, polystyrene, acrylonitrile-butadiene-styrene copolymers. Polypropylene, polyethylene, polyvinyl chloride, polyformaldehyde, and the like.

The coatings may be formed by coating the monomer onto the substrate by any conventional coating means such as roller coating, curtain coating, brushing, spraying, etc. The coated article is then cured by subjecting the coating to ionizing irradiation. It is noted that many of the monomers have extremely low viscosity thus ensuring easy application, if the composition is to be used as a coating.

The use of ionizing irradiation to polymerize the monomers is especially preferable as this method makes it possible to polymerize the coating at extremely high speeds and thus eliminates the time-consuming baking steps. As the use of ionizing irradiation requires no heating, the danger of high temperatures damaging substrates which are extremely heat-sensitive such as plastic is eliminated. It is noted that the use of heat adversely affects the dimensional stability and surface properties of many plastics.

It is also noted that the use of ionizing irradiation requires no solvents, thus reducing the danger of poisonous and explosive solvent vapors and that coatings formed by irradiating the monomers are more highly crosslinked and are generally stronger coatings.

The following Examples set forth specific embodiments of the instant invention. However, the invention is not to be construed as being limited to these embodiments as there are, of course, numerous possible variations and modifications. All parts and percentages in the Examples as well as throughout the specification are by weight unless otherwise indicated.

EXAMPLE 1

A flask equipped with a dry ice condenser was filled with 46 grams of ethylene glycol and cooled to 0°C. 196 grams of phosgene gas were bubbled through the ethylene glycol. The product formed was a bischloroformate of ethylene glycol.

A flask equipped with a dry ice condenser was filled with 85.3 grams of 2-hydroxyethyl acrylate, 250 milliliters of benzene, and 59 grams of trimethyl amine. The flask was cooled to 5°C. and 59.1 grams of the bischloroformate of ethylene glycol were added at a slow rate. The product was washed with sodium hydroxide, again washed with hydrochloric acid and finally washed with water and stripped. The final product which was a low viscosity, water-white liquid, had an OH value of 10.49, 1.41 percent chlorine and a yield of 33 percent.

EXAMPLE 2

A flask equipped with a dry ice condenser was filled with 200 grams of polyethylene glycol having a molecular weight of 200 and cooled to 0°C. 196 grams of phosgene gas were bubbled through the polyethylene glycol. The product was a bischloroformate of polyethylene glycol.

A flask was filled with 63 grams of 2-hydroxyethyl acrylate, 54.5 grams of pyridine and 200 milliliters of benzene. The flask was cooled to 5°C. and 88.5 grams of the bischloroformate of the polyethylene glycol were added. The product was washed with dilute sodium hydroxide and then washed with dilute hydrochloric acid and finally washed with water and stripped. The final product, which was a low viscosity, water-white liquid, had an OH value of 0, 1.76 percent chlorine and an 84 percent yield.

EXAMPLE 3

A flask equipped with a dry ice condenser was filled with 82 grams of diethylene glycol and cooled to 0°C. Phosgene gas was bubbled through the diethylene glycol until the mixture contained 196 grams of phosgene. The product formed was a bischloroformate of diethylene glycol.

A flask was filled with 116.1 grams of 2-hydroxyethyl acrylate, 100 grams of pyridine, and 100 milliliters of benzene. The flask was cooled to 5°C. and 115.5 grams of the above bischloroformate of diethylene glycol were added over a one-half hour period. The product was washed with dilute sodium hydroxide and then washed with dilute hydrochloric acid and finally washed with water and stripped. The final product which was a low viscosity, water-white liquid, had an OH value of 11.13 and contained 1.9 percent chlorine.

EXAMPLE 4

A flask was filled with 130 grams of 2-hydroxyethyl methacrylate, 100 grams of pyridine, and 300 milliliters of benzene, and cooled to 15°C. To this mixture, 115.5 grams of a bischloroformate of diethylene glycol were added dropwise. The reaction product was filtered, washed, and stripped.

The resulting product had a structure

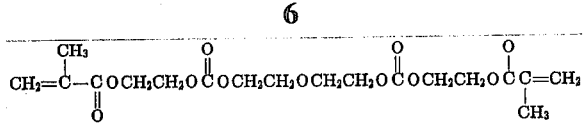

and had an acid number of 0.7, a hydroxy value of 2.28 and a Gardner-Holdt viscosity of E–F.

EXAMPLE 5

A diacrylate was formed by charging a vessel with 302.4 grams of acrylic acid and 1.6 grams of hydroquinone and heating to 110°C. To this mixture were then added 1.6 grams of N-methyl morpholine and 512 grams of glycidyl acrylate. The reaction was continued until an acid number of 13.6 was attained.

A flask was filled with 112.5 grams of the diacrylate prepared above and 50 grams of pyridine and 400 milliliters of benzene. The flask was cooled to 10°C. and 58 grams of the diethylene glycol bischloroformate prepared in Example 3 were added dropwise. The mixture was then heated for 1 hour at 40°C. and washed. The resulting product had an acid value of 0.84 and an OH value of 27.8.

EXAMPLE 6

A diacrylate was formed by charging a vessel with 316 grams of methacrylic acid and 1.62 grams of hydroquinone and heating to 110°C. To this mixture were then added 1.62 grams of N-methyl morpholine and 497 grams of glycidyl methacrylate. The reaction was continued until an OH value of 269 was obtained.

A flask was filled with 112 grams of the dimethacrylate prepared above, 50 grams of pyridine and 400 milliliters of benzene. The flask was cooled to 10°C. and 58 grams of the diethylene glycol bischloroformate prepared in Example 3 were added dropwise. The mixture was then heated for 1 hour at 40°C. and washed. The resulting product had an acid value of 0 and an OH value of 34.9.

EXAMPLE 7

A flask was charged with 125 grams of a tri-acrylate of 60 percent pentaerythritol tri-acrylate in pentaerythritol tetraacrylate, 25 grams of pyridine, and 400 milliliters of benzene. The temperature was brought to 10°C. and 27.4 grams of the bischloroformate of diethylene glycol formed in Example 3 were added. The mixture was heated to 40°C. for 1 hour and the product was filtered and washed. The yield was 77 percent and the OH value was 33.6.

EXAMPLE 8

A trischloroformate was formed by the following method.

A reactor vessel was charged with 722 grams of glycerine and heated to 100°C. in a nitrogen atmosphere. To the reactor were then added 14.4 grams of an 85 percent solution of potassium hydroxide in water and stirred at 125°C. The resulting mixture was charged to a pre-heated dry loop and purged with nitrogen. The mixture was heated to 200°–230°F. at 30-40 pounds per square inch pressure and 2,088 grams of ethylene oxide were added. The reaction was run for 6½ hours. The resulting glycerine-ethylene oxide adduct, after purification by washing, had a neutral acid number and an OH number of 483.38.

A reaction vessel was charged with 429 grams of the above prepared glycerine-ethylene glycol adduct, 437 grams of phosgene and 200 milliliters of chloroform. The reactants were cooled to −11°C. and reacted for 2½ hours. The resulting trischloroformate had the formula:

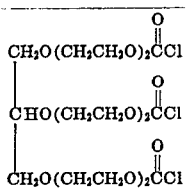

after being stripped of chloroform and contained 21.1 percent chlorine.

A reactor vessel was charged with 116 grams of hydroxyethyl acrylate, 100 grams of pyridine, and 400 milliliters of toluene and cooled to 10°–15°C. To the reactants were added 168.5 grams of the above prepared trischlorformate while the temperature was maintained at 10°–15°C. The reaction was carried out for one-half hour. The resulting product, after purification by washing, had the formula:

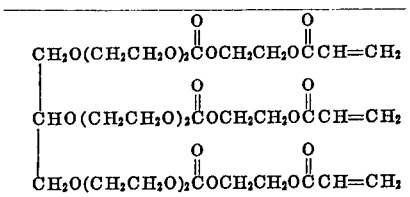

and had an acid value of 0, contained 0 percent chlorine, and had a hydroxyl number of 15.70.

EXAMPLE 9

A trischloroformate was prepared as in Example 8.

A reaction vessel was charged with 65 grams of 2-hydroxyethyl methacrylate, 50 grams of pyridine, and 400 milliliters of benzene and cooled to 10°–15°C. To the reactants were added dropwise for one-half hour, 84.2 grams of the trischloroformate of Example 8, while the temperature was maintained at 10°–15°C. The resulting product after purification by washing had the formula

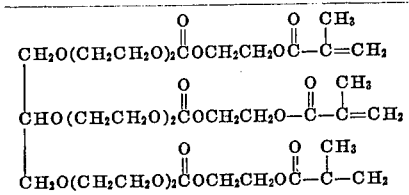

and contained 1.05 percent chlorine, and had a hydroxyl value of 18.38.

EXAMPLE 10

A 3-mil thick coating of the composition of Example 3 was coated on a Lexan substrate by the drawdown technique. The coated panel was then subjected to electron beam impingement in a nitrogen atmosphere at an accelerating potential of 400 KV and a tube current of 32 milliamps having a beam scan of 1 × 20 inches. The total dose given the coating was 5 megarads.

The resulting coating was a hard film which was tested for stain and solvent resistance by staining the film with ink, mustard, and thimerosal. The coating was found to be completely resistant to these materials.

The mar resistance and adhesion of the coating to the plastic substrate was found to be excellent.

EXAMPLE 11

A 3-mil thick coating of the composition of Example 3 was coated on an acrylonitrile-butadiene-styrene interpolymer substrate by the draw-down technique. The coated panel was then subjected to electron beam impingement in a nitrogen atmosphere at an accelerating potential of 400 KV and a tube current of 32 milliamps having a beam scan of 1 × 20 inches. The total dose given the coating was 5 megarads. The resulting coating was a hard film which was tested for stain and solvent resistance by staining the film with ink, mustard, and thimerosal. The coating was found to be completely resistant to these materials.

The coating was found to have excellent adhesion and mar resistance.

According to the provisions of the patent statutes, there is described above the invention and what are now considered to be its best embodiments. However, within the scope of the appended claims, it is to be understood that the invention can be practiced otherwise than as specifically described.

I claim:

1. A method of preparing a coated plastic substrate comprising applying to the plastic substrate a composition comprising the reaction product of a polychloroformate which is the reaction product of phosgene and a compound having the formula $R''(OH)_x$ wherein $R''$ is a member of the group consisting of alkyl, aryl and cycloalkyl, and substituted alkyl, aryl and cycloalkyl groups containing from about two carbon atoms to about 20 carbon atoms wherein the substitution does not contain an active hydrogen atom and $x$ is a whole number from 2 to 4 carried out at a temperature of from about −10°C. to about 25°C. and an acrylate having the formula

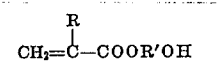

wherein R is selected from the group consisting of hydrogen and methyl and R' is an unsubstituted or halogen, alkoxy or R''COO— substituted alkyl group wherein the alkyl radical has from about two to about 16 carbon atoms wherein the reaction is carried out at a temperature of from about −10°C. to about 50°C. in the presence of an acid acceptor and subjecting the coated substrate to high energy ionizing irradiation.

2. The method of claim 1 wherein the total dosage of irradiation is from 0.2 to about 20 megarads.

3. The method of claim 1 wherein $R''(OH)_x$ is ethylene glycol.

4. The method of claim 1 wherein the acrylate is hydroxy ethyl acrylate.

5. The method of claim 1 wherein the plastic substrate is polymethyl methacrylate.

6. The method of claim 1 wherein the plastic substrate is the reaction product of phosgene and bisphenol A.

7. The method of claim 1 wherein the plastic substrate is polyethylene.

8. The coated substrate formed by the method of claim 1.

* * * * *